United States Patent [19]

Onaka et al.

[11] Patent Number: 5,190,361
[45] Date of Patent: Mar. 2, 1993

[54] ANTI-SKID BRAKE SYSTEM FOR AN AUTOMOTIVE VEHICLE

[75] Inventors: Toru Onaka; Toshiaki Tsuyama; Kazutoshi Nobumoto, all of Hiroshima, Japan

[73] Assignee: Mazda Motor Corporation, Hiroshima, Japan

[21] Appl. No.: 814,601

[22] Filed: Dec. 30, 1991

[30] Foreign Application Priority Data

Dec. 28, 1990 [JP] Japan .................................. 2-417433

[51] Int. Cl.$^5$ .............................................. B60T 8/32
[52] U.S. Cl. .................. 303/100; 188/181 A; 303/103; 303/106; 303/109
[58] Field of Search .............. 303/100, 102, 103, 104, 303/105, 106, 107, 108, 109, 110, 94–99, 92; 180/197; 364/426.01, 426.02, 426.03; 188/181 A, 181 C

[56] References Cited

U.S. PATENT DOCUMENTS 5,000,281 3/1991 Nobumoto et al. ............ 303/102 X

Primary Examiner—Douglas C. Butler
Attorney, Agent, or Firm—Fish & Richardson

[57] ABSTRACT

A shift is implemented from the control for elevating the braking force to the control for retaining the braking force when deceleration of the wheel exceeds a first predetermined threshold value when the wheels are braked. The first predetermined threshold value is so set as to become smaller as an assumed road surface friction coefficient $\mu$ is smaller. The first threshold value is further altered to a larger value by altering the assumed road surface friction coefficient $\mu$ to a higher one when the period of time required from the start of the control for elevating the braking force to the start of the following control for retaining the braking force is equal to or shorter than a predetermined period of time.

13 Claims, 8 Drawing Sheets

ANTI-SKID BRAKE SYSTEM FOR AN AUTOMOTIVE VEHICLE

BACKGROUND OF THE INVENTION

1. Field of the Invention

The present invention relates to an anti-skid brake system for an automotive vehicle.

2. Description of the Related Art

Recently, an increasing number of automotive vehicles are loaded with an anti-skid brake system (usually called "ABS system") which is arranged to prevent the wheel from locking at the moment of braking. In order to operate the anti-skid brake system, i.e. to control the braking force, there may be three modes for controlling the braking force, a first mode being to reduce the braking force, a second mode being to elevate the braking force, and a third mode being to hold the braking force.

It is noted herein that the determination if the wheel is locked is made on the basis of a slip value given from an assumed vehicle speed to be determined theoretically and an actual wheel speed. Hence, the determination if the control of the braking force should be started can be implemented by determining if the slip value exceeds a predetermined threshold value.

Further, the magnitude of deceleration can be determined with ease and with accuracy by differentiating the wheel speeds detected by wheel speed sensors, and the magnitude of deceleration indicates a behavior of the wheels with considerable accuracy. Hence, if the ABS control should be started can be determined by determining if the magnitude of deceleration of the wheel exceeds a predetermined threshold value. Japanese Patent Laid-open Publication (kokoku) No. 61-24,220 discloses an example that takes advantage of the magnitude of deceleration of the wheel for the ABS control. This publication proposes the determination if the control of reducing the braking force has been finished by determining if the magnitude of deceleration of the wheel exceeds a predetermined threshold value.

On the other hand, strong demands in the ABS control have recently been made to shorten a distance required upon braking the wheels, i.e. a braking distance. In order to shorten the braking distance, it is disadvantageous to start the ABS control at an unnecessarily early timing. However, the ABS control is likely to be started at an unnecessarily early timing when the determination of starting the ABS control is made by taking advantage of the slip value or the magnitude of deceleration of the wheel. More specifically, particularly when the wheels are braked rapidly and strongly, acoustic tires serving as members for contacting the wheels with a road surface are forcibly transformed due to elasticity in the initial stage of braking and then returned to their original shapes due to elasticity. This appears as a phenomenon in which the magnitude of deceleration of the wheel becomes larger once in the initial stage of braking and then smaller. In other words, the slip value becomes once smaller and then larger. Hence, if the ABS control starts on the basis of the magnitude of deceleration of the wheel or the slip value, which appears in the initial stage of the phenomenon, there is the risk that the ABS control is started at an unnecessarily early timing.

SUMMARY OF THE INVENTION

The object of the present invention is to provide an anti-skid brake system for an automotive vehicle so adapted as to prevent the timing of starting the ABS control from becoming unnecessarily early with certainty.

In order to achieve the aforesaid object, the present invention provides an anti-skid brake system for an automotive vehicle capable of starting the control of braking force for preventing the wheel from being locked when a predetermined condition for starting the control thereof is met, comprising:

vehicle speed detecting means for detecting a vehicle speed;

wheel speed detecting means for detecting a speed of rotation of the wheel;

difference determining means for determining a difference between the vehicle speed detected by the vehicle speed detecting means and the wheel speed detected by the wheel speed detecting means; and inhibition means for inhibiting the start of the control of the braking force when the difference is smaller than a predetermined value.

It is to be noted that the difference between the vehicle speed and the wheel speed does not vary to a great extent because of the return of the acoustic tires from the transformed shape to the original shape due to elasticity. Hence, it is preferred to prevent the ABS control from being started at an unnecessarily early timing by inhibiting the start of the ABS control when the difference between the vehicle speed and the wheel speed is smaller than the predetermined value.

It is further preferred to employ a sum obtained by the addition means for adding up the differences, as a difference to be determined for inhibiting the ABS control, i.e. to be compared with the predetermined value.

The sum obtained by the addition means is a value obtained by adding up the differences between the vehicle speed and the wheel speed in a predetermined period of time. It is to be noted herein that the sum does not become so large even if the difference between the vehicle speed and the wheel speed would become temporarily larger when the transformation of the acoustic tires is returned to their original shapes. Hence, the phenomenon that causes the slip value to become once smaller and then larger can be prevented with certainty, thereby preventing the ABS control from being started at an unnecessarily early timing by inhibiting the start of the control of the braking force as long as the sum does not exceed the predetermined threshold value.

In addition, it is preferred to release the inhibition of the start of the ABS control by the inhibition means during cornering of the vehicle body because the possibility becomes bigger that an error in the difference between the vehicle speed and the wheel speed is caused to occur.

Further, the setting of the inhibiting conditions by the inhibition means is preferably restricted to road having a high road surface friction coefficient $\mu$ on which the aforesaid phenomenon.

Furthermore, it is preferred to set the basic condition for starting the control of the braking force.

Other objects, features and advantages of the present invention will become apparent from the description of the preferred embodiments, which follows, with reference to the accompanying drawings.

DESCRIPTION OF THE PREFERRED EMBODIMENTS

Figure 1:
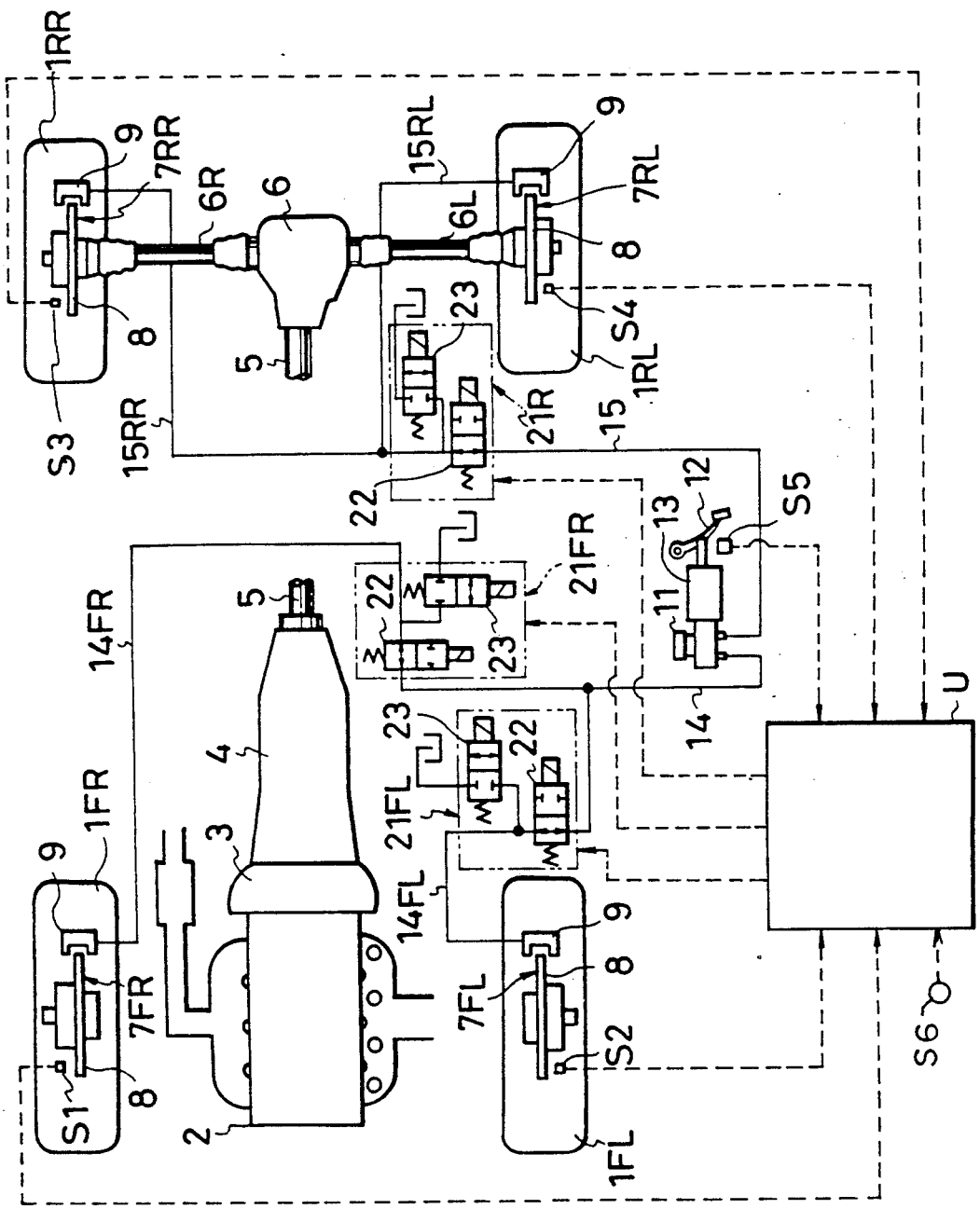
FIG. 1 is a system representation showing an outline of the anti-skid brake system according to an embodiment of the present invention.

As shown in FIG. 1, reference numeral 1FR stands for a right-hand front wheel, reference numeral 1FL for a left-hand front wheel, reference numeral 1RR for a right-hand rear wheel and reference numeral 1RL for a left-hand rear wheel. The output torque of an internal combustion engine 1 is transmitted through a clutch 3, a transmission 4, a propeller shaft 5 and a differential 6 to a right-hand driving shaft 6R and a left-hand driving shaft 6L, through which the output torque is transmitted to the right-hand rear wheel 1RR and the left-hand rear wheel 1RL, respectively.

Mounted to the wheels 1FR, 1FL, 1RR and 1RL are braking units 7FR, 7FL, 7RR and 7RL, respectively, each of which has a disc 8 arranged so as to be rotatable integrally with the respective wheel and a caliper 9 with a wheel cylinder built therein.

Reference numeral 11 denotes a master cylinder as means for generating braking oil pressure, and a force obtained by depressing a braking pedal 12 is entered into the master cylinder 11 through a servomechanism 13. The master cylinder 11 is of a tandem type having two outlets, and a braking pipe 14 extending from one of the outlets branches into two branch pipe sections at its intermediate position. The right-hand branch pipe sections 14FR is connected to the wheel cylinder of the brake unit 7FR for the right-hand front wheel, while the left-hand branch pipe section 14FL is connected to the wheel cylinder of the brake unit 7FL for the left-hand front wheel. Further, a braking pipe 15 extending from the other outlet of the master cylinder 11 branches into two branch pipe sections at its intermediate position, and the right-hand branch pipe section 15RR is connected to the wheel cylinder of the brake unit 7RR for the right-hand rear wheel while the left-hand branch pipe section 15RL is connected to the wheel cylinder of the brake unit 7RL for the left-hand rear wheel.

A right-hand oil pressure adjusting mechanism 21FR is connected to the right-hand branch pipe section 14FR for the right-hand front wheel and a left-hand oil pressure adjusting mechanism 21FL is connected to the left-hand branch pipe section 14FL for the left-hand front wheel. On the other hand, a common oil pressure adjusting mechanism 21R is connected to the common pipe 15 for the right-hand and left-hand rear wheels. Each of the oil pressure adjusting mechanisms 21FR, 21FL and 21R has a first opening-closing valve 22 and a second opening-closing valve 23, each of the first and second opening-closing valves 22 and 23 being of an electromagnetic type. The first opening-closing valve 22 opens or closes the right-hand pipe section 14FR, the left-hand pipe section 14FL or the common pipe 15, while the second opening-closing valve 23 opens or closes a passage communicating each of the pipes with a reserve tank. This arrangement can shift the braking oil pressure to be supplied to the brake units 7FR, 7FL, 7RR and 7RL so as to be increased, decreased or retained, when the wheels are braked by the braking oil pressure generated in the master cylinder 21. In other words, the braking oil pressure is decreased by closing the first opening-closing valve 22 and opening the second opening-closing valve 23, the braking oil pressure is increased by opening the first opening-closing valve 22 and closing the second opening-closing valve 23, and the oil pressure is retained by closing both of the first and second opening-closing valves 22 and 23. It is further to be noted in this embodiment that the braking oil pressure is rapidly increased in the initial stage of an increase in the braking oil pressure and the rate of the increase is thereafter slowed down to such an extent as increasing gradually. This control is implemented, for example, by subjecting a speed (an angle) of opening the first opening-closing valve 22 to duty control.

In FIG. 1, reference symbol U denotes a control unit composed of a microcomputer with CPU, ROM, RAM, CLOCK, I/O interface, etc. built therein. Entered into the control unit U are signals from switches S1, S2, S3 and S4, which are to sense speeds of rotation of the right-hand and left-hand front wheels 1FR and 1FL as well as the right-hand and left-hand rear wheels 1RR and 1RL, respectively. Further, a signal from a switch S5 is entered, which is a brake switch that is turned on when the braking pedal 12 is depressed. The control unit U controls the oil pressure adjusting mechanisms 21FR, 21FL and 21R, while the control unit U performs the ABS control for the right-hand and left-hand front wheels 1FR and 1FL in an independent and separate manner as well as for the right-hand and left-hand rear wheels 1RR and 1RL in an integrated manner. It is to be noted that, as the condition for the start of the ABS control, the brake switch S5 may be turned on, although the condition that the brake switch S5 is turned on can be excluded from the conditions for the start of the ABS control.

FIG. 2

Figure 2:
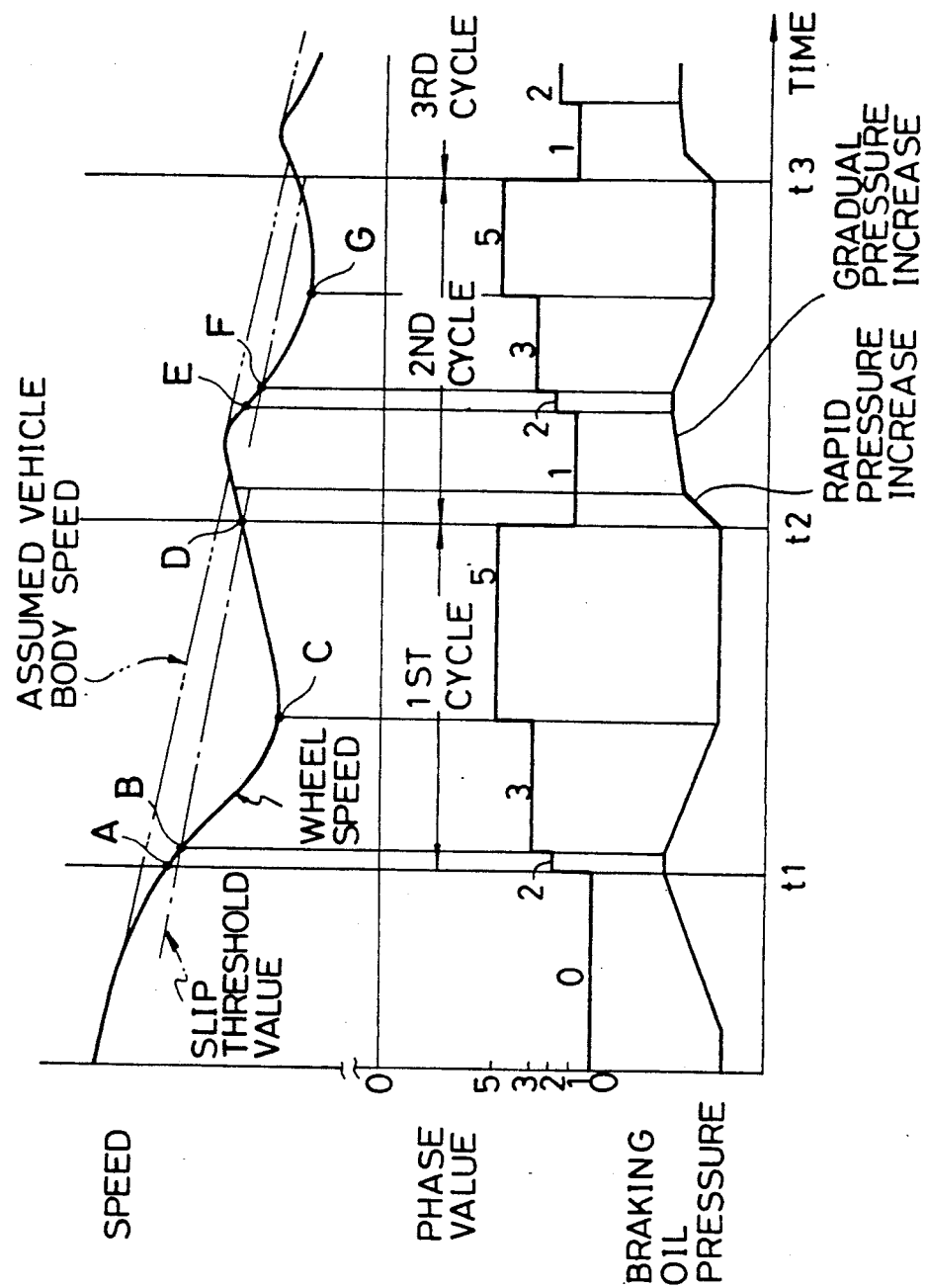
FIG. 2 is a time chart showing control of the anti-skid brake system according to the present invention.

The contents of the ABS control by the control unit U will be described with reference to FIG. 2. In performing the ABS control, phases 0, 1, 2, 3 and 5 are employed, which have the following meanings:

Phase 0: non-ABS control

Phase 1: increasing pressure (elevating the breaking force)

Phase 2: retaining pressure (holding the braking force) after non-ABS control or after increasing pressure Phase 3: decreasing pressure (reducing braking force)

Phase 5: retaining pressure after control for decreasing pressure

The slip value indicating the tendency of locking the wheel is determined by the following formula:

Slip value = (wheel speed/assumed vehicle body speed) × 100%

In this embodiment, the smaller the slip value, the greater the tendency of locking the wheels.

Given the foregoing, no ABS control is carried out up to the time t1 (phase 0) and the wheel speed is slowed down gradually to a level lower than the assumed vehicle body speed as the braking oil pressure is elevated. By slowing the wheel speed down, the magnitude of deceleration of the wheel speed is increased and reaches a predetermined value at the time t1, i.e. the moment A, which satisfies the condition under which to start the ABS control, i.e. control by the anti-skid brake system.

As the ABS control starts at the moment A, the braking oil pressure is first retained. The wheel speed is slowed down, however, while the braking oil pressure is retained. As the slip value is decreased and reaches a predetermined threshold value at the moment B (phase 2), then the oil pressure starts reducing and the extent to which the wheel speed is slowed down becomes so slow that the magnitude of deceleration reaches approximately zero at the moment C (phase 3).

At the moment C when the magnitude of deceleration has reached approximately zero, the braking oil pressure is retained as it is, thereby increasing the wheel speed gradually and returning the slip value to the predetermined threshold value at the moment D (phase 5). From the moment D, the braking oil pressure is increased in such a manner that it is increased in the initial stage to such an extent as the rate of increasing the pressure is rapid and thereafter to a slower extent. It is noted that phase 1 continues from the moment D to the moment E (phase 1).

By increasing the braking oil pressure at the moment D, the deceleration of the wheel speed is increased again and reaches the predetermined value satisfying the condition for the start of the ABS control at the moment E. Then, the braking oil pressure is retained from the moment E up to the moment F at which the slip value is lowered to a predetermined threshold value (phase 2), followed by reducing the braking oil pressure up to the moment G (phase 3) corresponding to the moment C. After the moment G, the braking oil pressure is retained (phase 5).

The arrangement as described hereinabove is an outline of the ABS control, i.e. the control by the anti-skid brake system. One control cycle continues from the moment D at which phase 5 ends, i.e. from the moment when the braking oil pressure has been decreased and starts increasing, to the end of the next phase 5. In other words, one control cycle comprises phases 1, 2, 3 and 5. It is to be noted herein that only the very first control cycle comprises phases 2, 3 and 5 because the ABS control starts from the phase 2.

The threshold value at which the phase is changed varies with a friction coefficient $\mu$ on a road surface, i.e. a road surface friction coefficient $\mu$. An example of setting the threshold values in accordance with the road surface friction coefficient $\mu$ is shown as follows:

| Road Surface Friction Coefficient $\mu$ | Phases | | |
| --- | --- | --- | --- |
| | 1 → 2 | 2 → 3 5 → 1 | 3 → 5 |
| 1 (Low) | −0.5G | 95% | 0G |
| 2 (Medium) | −1.0G | 90% | −0.2G |
| 3 (High) | −1.5G | 85% | −0.5G |

FIG. 3

Figure 3:
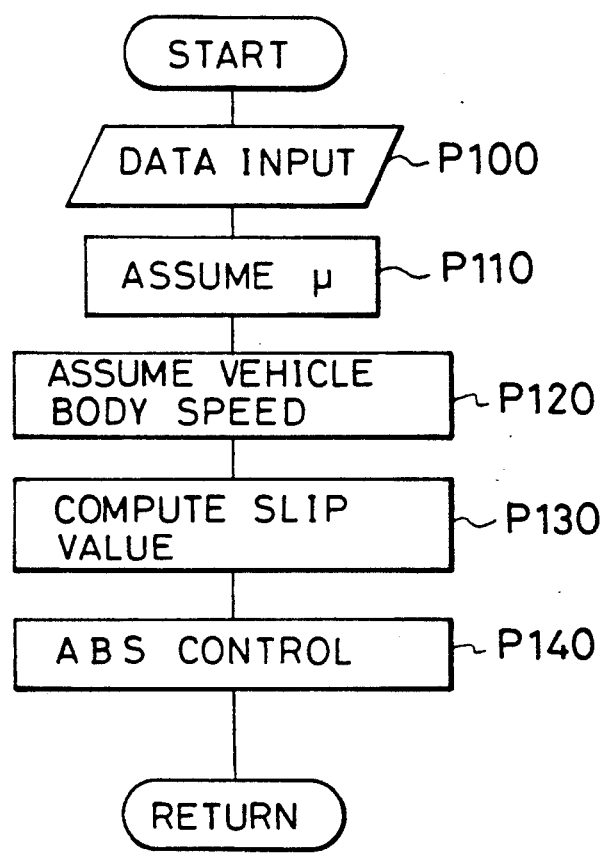
FIGS. 3, 4 and 5 are flow charts showing an example of the control by the anti-skid brake system according to the present invention.

FIG. 3 shows the flow chart showing an example of the control relating to the present invention.

First, at step P100, signals are entered into the control unit U from the switches S1 to S5, followed by proceeding to step P110 at which the road surface friction coefficient $\mu$ is assumed. Then, at step P120, the vehicle body speed is assumed to determine the assumed vehicle body speed and, at step P130, the slip value for the ABS control is computed, followed by proceeding to step P140 at which the ABS control is implemented.

FIG. 4

Figure 4:
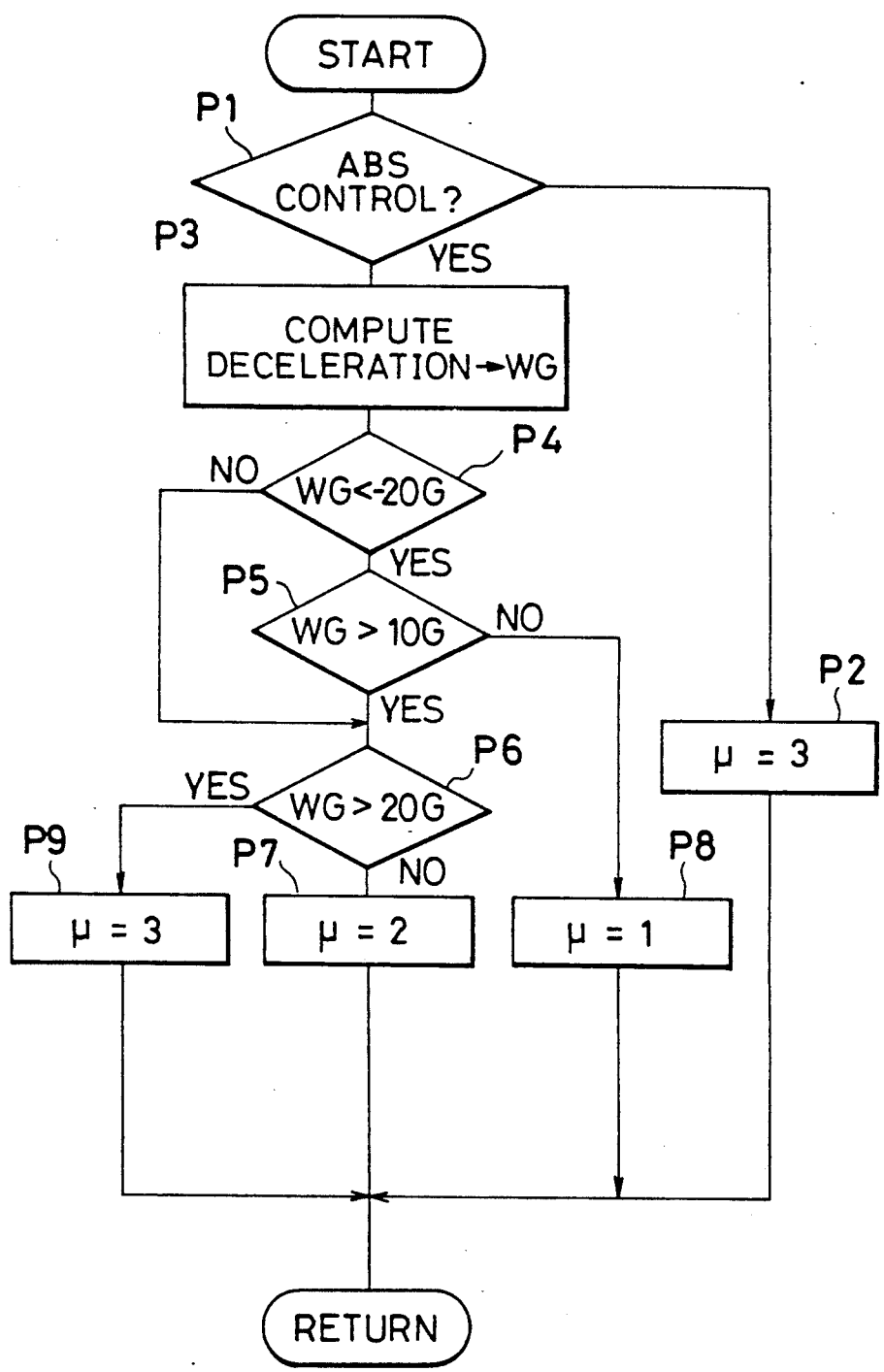

FIG. 4 shows the practices for assuming the road surface friction coefficient according to the contents at step P110 of FIG. 3.

First, at step P1, a decision is made to determine if the ABS control is currently in progress and the road surface friction coefficient $\mu$ is set at step P2 to 3 ($\mu=3$), i.e. a high road surface friction coefficient $\mu$, when it is decided at step P1 that no ABS control is currently in progress. In other words, when no control by the anti-skid brake system is currently carried out, the road surface friction coefficient $\mu$ is forcibly set to a high value, thereby suppressing the braking oil pressure from being reduced at the initial time when the ABS control starts and reducing the braking distance.

On the other hand, when the result of decision at step P1 indicates that the ABS control is currently being performed, then the program flow goes to step P3 at which the speed of accelerating or decelerating the wheels, WG, is computed (renewed) by differentiating the wheel speeds. In computing the speed of accelerating or decelerating the wheels, WG, the maximum value for a predetermined period of time is stored in the RAM of the control unit U as acceleration, while the minimum value therefor is stored as deceleration. Then, at step P4, it is decided to determine if the deceleration (WG) is smaller than −20 G (G indicating gravity) as a predetermined threshold value. It is to be noted herein that the threshold value of −20 G means a value corresponding to −20 G in a predetermined sampling cycle of the wheel speed and this meaning is applicable likewise to the following description.

When the result of decision at step P4 indicates that the magnitude of deceleration is smaller than −20 G, there is the possibility that the road surface friction coefficient $\mu$ is so low that, at step P5, a decision is made to determine if the magnitude of acceleration (WG) is larger than 10 G. When it is decided at step P5 that the magnitude of acceleration is not larger than 10 G, then the road surface friction coefficient $\mu$ is set at step P8 to 1 ($\mu=1$), i.e. a low road surface friction coefficient $\mu$.

On the other hand, when the result of decision at step P4 indicates that the magnitude of deceleration is not smaller than −20 G and the result of decision at step P5 indicates that the magnitude of acceleration is larger than 10 G, then the program flow goes to step P6 at which a decision is made to determine if the magnitude of acceleration (WG) is larger than 20 G. As a result of decision at step P6 indicates that the magnitude of acceleration (WG) is not larger than 20 G, then the road surface friction coefficient $\mu$ is set at step P7 to 2 ($\mu=2$), i.e. a medium road surface friction coefficient $\mu$. On the other hand, when it is decided at step P6 that the magnitude of acceleration is larger than 20 G, then the program flow is returned to step P9 at which the road surface friction coefficient $\mu$ is set to 3 ($\mu=3$).

After steps P7 or P8, a decision is further made at step P10 to determine if phase 1 continues for a predetermined period of time or shorter. When it is decided at step P10 that the phase 1 continues for a period of time longer than the predetermined period of time, on the one hand, the road surface friction coefficient $\mu$ is set at step P11 to a value higher by one stage than the previous road surface friction coefficient $\mu$ determined at step P7 or step P8. On the other hand, when the result of decision at step P10 is in the negative, then the program flow is returned as it is.

Figure 5:
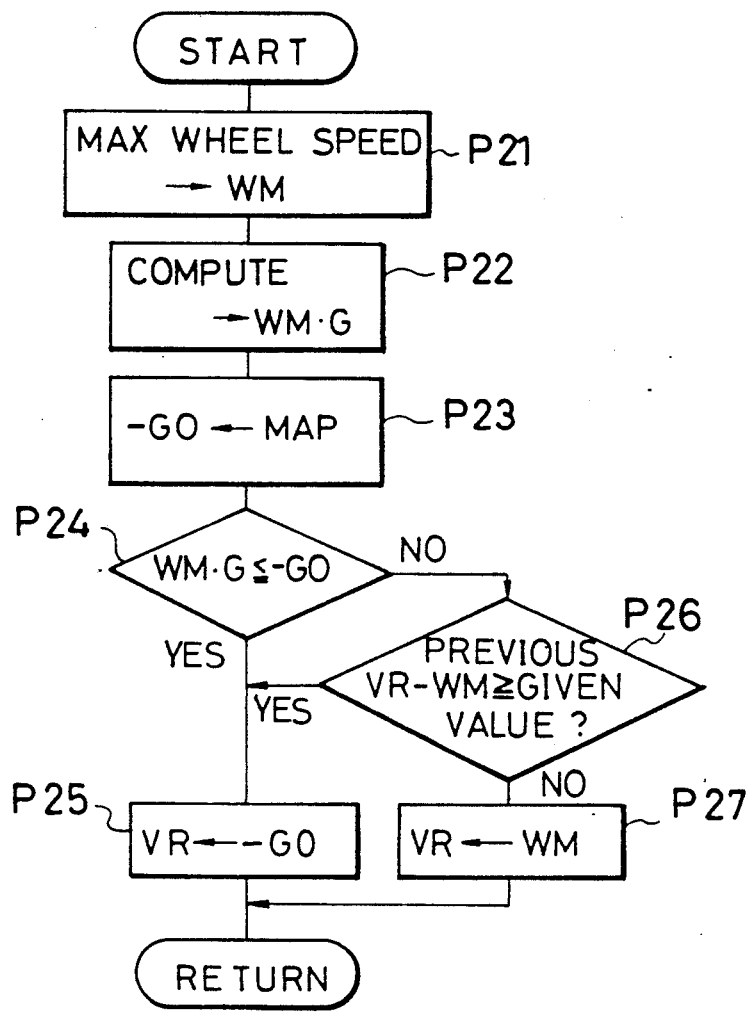
Figure 6:
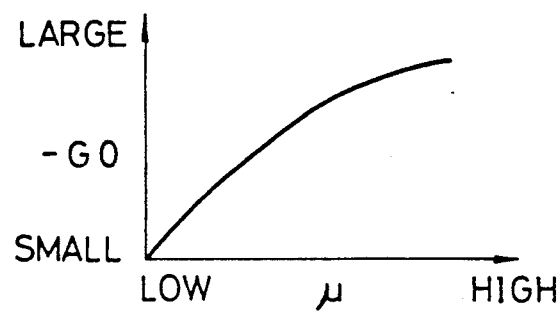
FIG. 6 is a graph showing the relationship between the road surface friction coefficient $\mu$ and reference deceleration.

FIGS. 5 and 6

FIGS. 5 and 6 show the practices for assuming the vehicle body speed corresponding to the contents of the control at step P120 in FIG. 3.

First, at step P21 of FIG. 5, the wheel speeds of all the wheels 1FR, 1FL, 1RR and 1RL are detected and the fastest one out of the four wheels is set as a maximum wheel speed WM. Then, at step P22, a varying quantity of the wheel having the maximum wheel speed WM, i.e. a magnitude of acceleration or deceleration, WM-G, of the maximum wheel speed, is computed by differentiating the maximum wheel speed WM. The magnitude of acceleration or deceleration, WM-G, is computed by subtracting the previous wheel speed from the current wheel speed.

Then, at step P23, a reference deceleration $-G0$ is determined in accordance with the road surface friction coefficient $\mu$. It is to be noted herein that the term "reference deceleration $-G0$" is intended to mean a maximum magnitude of deceleration to be predicted as occurring in accordance with the road surface friction coefficient $\mu$ at the moment of braking. FIG. 6 shows the relationship between the reference deceleration $-G0$ and the road surface friction coefficient $\mu$. In FIG. 6, the reference deceleration $-G0$ is set to be smaller as the road surface friction coefficient becomes smaller. In other words, the absolute value G0 of the reference deceleration $-G0$ is set to be larger as the road surface friction coefficient $\mu$ becomes smaller. In this embodiment, the reference deceleration $-G0$ is determined in three stages because the road surface friction coefficient $\mu$ is so arranged as to be determined in three stages.

Then, at step P24, a decision is made to determine if the magnitude of acceleration or deceleration, WM-G, of the maximum wheel speed is smaller than the reference deceleration $-G0$. When it is decided at step P24 that the magnitude of acceleration or deceleration, WM-G, of the maximum wheel speed is equal to or smaller than the reference deceleration $-G0$, then the program flow goes to step P25 at which the assumed vehicle body speed VR is set on the basis of the reference deceleration $-G0$, followed by the return of the program flow. In other words, as the wheel speed at this moment becomes small rapidly, a value obtainable by subtracting the speed corresponding to the reference deceleration $-G0$ from the previously (latest) assumed vehicle body speed VR is set as the next (current) assumed vehicle body speed VR in order to suppress the assumed vehicle body speed from being reduced rapidly.

When it is decided at step P24 that the magnitude of acceleration or deceleration, WM G, of the maximum wheel speed is larger than the reference deceleration $-G0$, on the other hand, then a decision is made at step P26 to determine if the value obtainable by subtracting the maximum wheel speed WM from the previous assumed vehicle body speed VR is equal to or larger than a predetermined value. When it is decided that the magnitude of acceleration or deceleration, WM-G, of the maximum wheel speed is larger than the reference deceleration $-G0$, then the program flow proceeds to step P25 in order to suppress the assumed vehicle body speed from being decreased rapidly because the wheel speed at this moment is decreasing to a considerably rapid extent.

On the other hand, when the result of decision at step P26 indicates that the magnitude of acceleration or deceleration, WM-G, of the maximum wheel speed is smaller than the reference deceleration $-G0$, then the maximum wheel speed WM is set as the assumed vehicle body speed as it is.

It is noted as a matter of course that the assumed vehicle body speed determined at step P25 or P27 is employed as the previous assumed vehicle body speed at step P26.

FIG. 7

Figure 7:
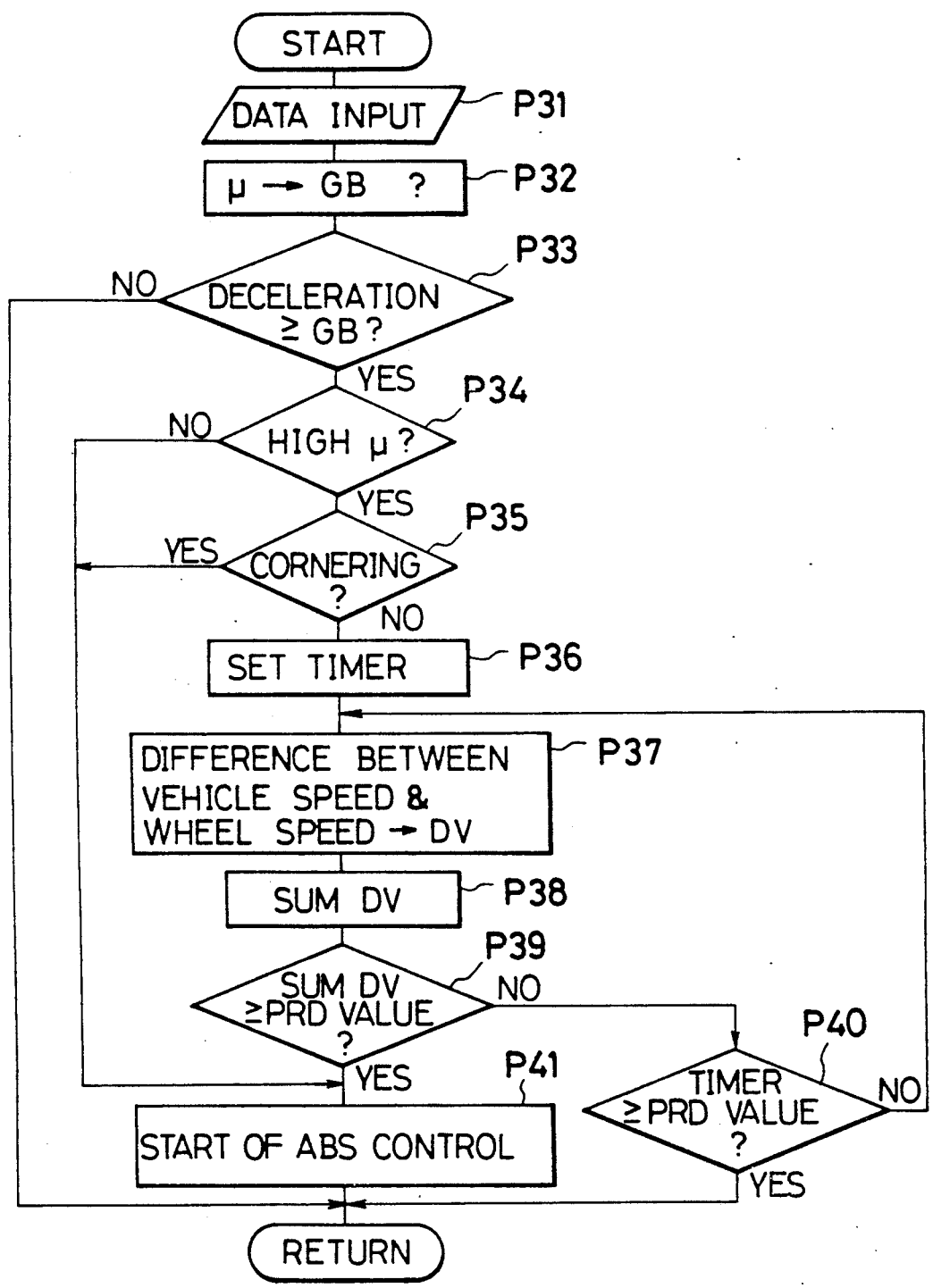
FIG. 7 is a flowchart showing a control example according to the present invention.

FIG. 7 shows the control contents of step P140 of FIG. 3 for determining if the control of the braking force, i.e. the ABS control, is started.

First, at step P31, signals are entered from the sensors, followed by proceeding to step P32 at which a reference deceleration GB as a threshold value for starting the ABS control is read on the basis of an assumed road surface friction coefficient $\mu$ (reference being made to the column (phase 1→2 in Table above). Then, at step P33, a decision is made to determine if the magnitude of deceleration of the wheel is equal to or larger than the reference deceleration GB. When it is decided at step P33 that the magnitude of deceleration of the wheel is smaller than the reference deceleration GB, the program flow is return as it is because no ABS control is required.

When the result of decision at step P33 is in the negative, then a further decision is made at step P34 to determine if the assumed road surface friction coefficient $\mu$ is high, i.e. if the road surface friction coefficient $\mu$ is set to 3. If it is decided at step P34 that the road surface friction coefficient $\mu$ is not set to 3, then the program flow goes to step P41 at which the ABS control is started because it is determined that there occurs no such phenomenon as returning the acoustic tires to their original shapes after their elastic transformation. On the other hand, if the result of decision at step P34 indicates that the road surface friction coefficient $\mu$ is high, a further decision is made at step P35 to determine if the automotive vehicle is cornering, that is, if a steered angle of the steering wheel is equal to or greater than a predetermined value. When it is decided at step P35 that the automotive vehicle is cornering, then the program flow goes to step P41, too, at which the ABS control is started.

If the result of decision at step P35 is in the negative, the timer is set at step P36, followed by proceeding to step P37 at which a difference DV is given by subtracting the wheel speed from the vehicle speed (the assumed vehicle speed) and then proceeding to step P38 at which the differences DV are added up. Then, at step P39, it is decided to determine if the sum DV is equal to or larger than a predetermined value. It is to be noted herein that, at step P37, the latest values read at the time of step P37 are employed as the vehicle speed and the wheel speed.

When it is decided at step P39 that the sum DV is smaller than the predetermined value, a decision is made at step P40 to determine if a count value of the timer is equal to or larger than a predetermined value, i.e. if the number of summations of the differences DV is equal to or greater than a predetermined value. If the decision at step P40 gives the negative result, on the one hand, then the program flow returns to step P37. If the decision at step P40 gives the affirmative result, on the other hand, then the program flow is returned as it is because the sum DV did not reach the predetermined value, thereby inhibiting the ABS control.

When it is decided at step P39 that the sum DV is equal to or larger than the predetermined value, then the ABS control is started at step P41.

In the example as shown in FIG. 7, the sum DV is compared with the predetermined value at step P39 in every cycle ranging from step P37 through step P39 and step P40 to step P37, that is, at every time when the sum value is renewed at step P38, and the ABS control is set in the direction relatively likely to be started. In other words, if the predetermined value for the timer at step P40 is set to determine if the n-fold summations are made at step P38, the determination is made in times at step P39.

It is to be noted herein that the summation or addition at step P38 is made by adding up the current sum value to the previous sum value that is stored in the ROM of the control unit U. Further, it is noted herein that the predetermined value to be employed at step P61 may be set so as to be altered in accordance with the road surface friction coefficient $\mu$, that is, that the predetermined value becomes smaller as the road surface friction coefficient $\mu$ becomes smaller.

FIG. 8

Figure 8:
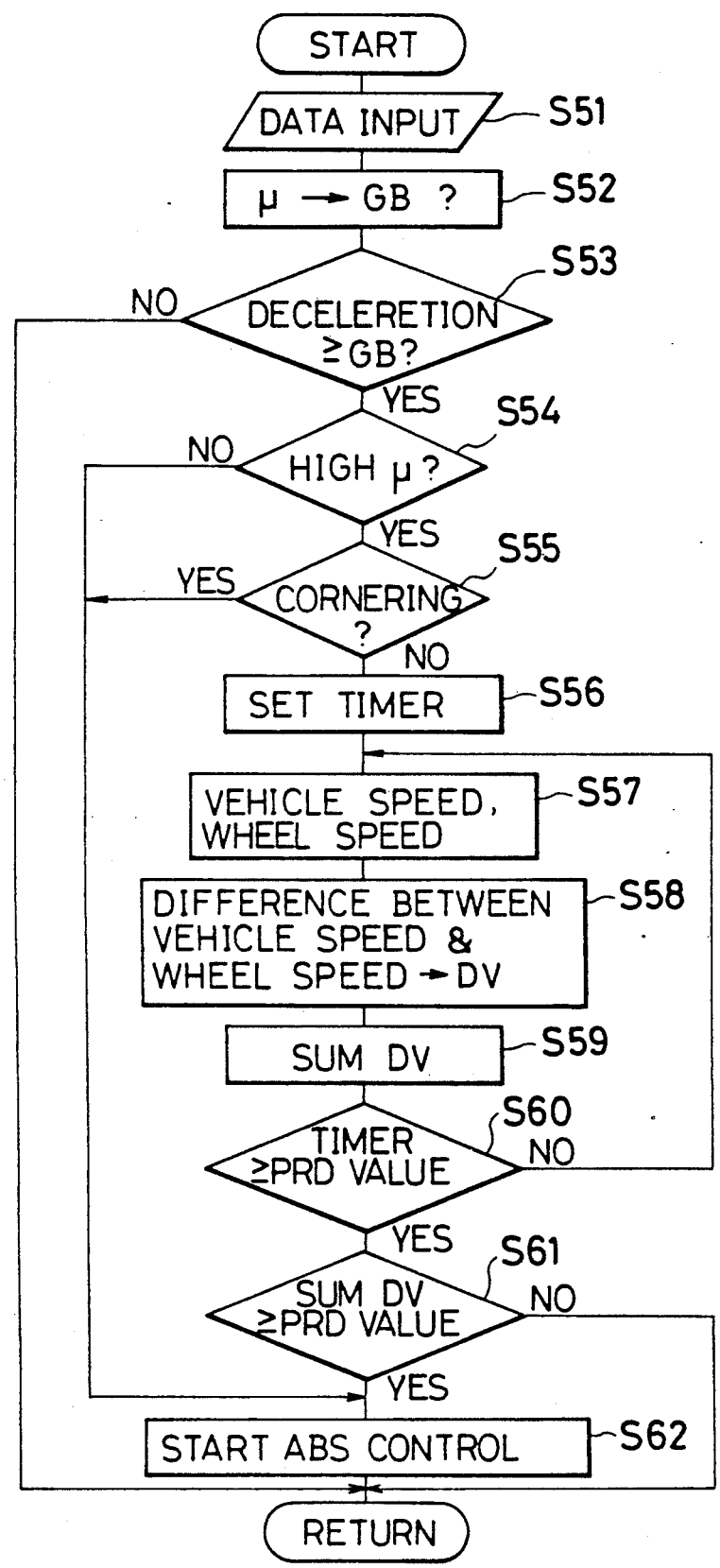
FIGS. 8, 9 and 10 are flowcharts showing another example according to the present invention.

FIG. 8 shows another example of the contents of the control according to the present invention and corresponds to FIG. 7. Steps P51 to P56, P58, P59 and P62 in FIG. 8 correspond respectively to steps P31 to P36, P37, P38 and P41 in FIG. 7. In FIG. 8, step P57 is provided separately in order to clarify that the vehicle speed and the wheel speed computed at step P58 are the latest (reference is made to description on step P37 in FIG. 7).

In FIG. 8, the differences DV are added up at step P59, followed by step P60 at which a decision is made to determine if the timer value is equal to or larger than a predetermined value. If the result of decision at step P60 indicates that the timer value is smaller than the predetermined value, the program flow returns to step P57 at which the addition or summation of the differences DV is continued.

At the time when the decision at step P60 gives the affirmative result, it is then decided at step P61 to determine if the total sum DV added up so far is equal to or larger than the predetermined value. When the result of decision at step P61 indicates that the total sum DV is equal to or larger than the predetermined value, then the program flow goes to step P62 at which the ABS control is started.

On the other hand, when the decision at step P61 gives the negative result, then the program flow is returned as it is without starting the ABS control.

In the example as shown in FIG. 8, the decision at step P61 is so arranged as to give no affirmative result as long as the differences DV are added up in the predetermined times within the predetermined period of time. This arrangement can certainly lose the influence of noises resulting from the phenomenon of the acoustic tires returning to its original shapes from their elastic transformation, thereby allowing the start of the ABS control only at the moment when the ABS control is actually required.

FIG. 9

Figure 9:
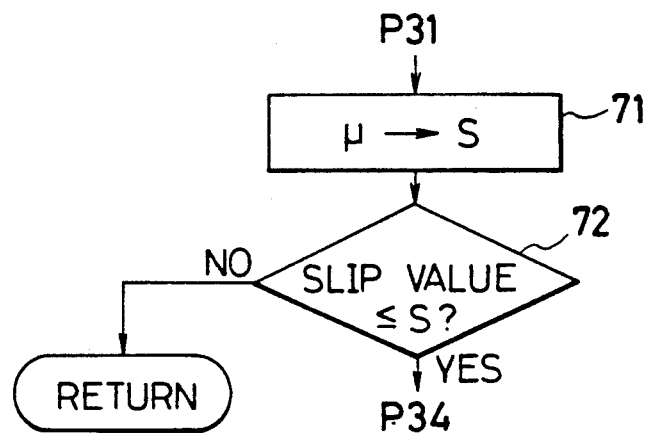

FIG. 9 shows a further embodiment of the present invention and corresponds to steps P32 and P33 in FIG. 7 or to steps P52 and P53 in FIG. 8. The remainder is the same as in FIG. 7 and FIG. 8.

At step P71, a reference slip value S is determined in accordance with the road surface friction coefficient $\mu$ as a threshold value for starting the ABS control. The reference slip value S is set to become larger as the road surface friction coefficient $\mu$ becomes smaller. In other words, the reference slip value S is set so as to become a value in the direction in which the tendency of locking the wheel becomes smaller. Then, at step P72, a decision is made to determine if the actual slip value of the wheel is equal to or smaller than the reference slip value S. When it is decided at step P72 that the actual slip value is larger than the reference slip value S, on the one hand, the program flow is returned as it is and no ABS control is started. When the decision at step P72 gives the affirmative results, on the other hand, the processing is implemented in the same manner as at step P34 in FIG. 7 or at step P54 in FIG. 8.

FIG. 10

Figure 10:
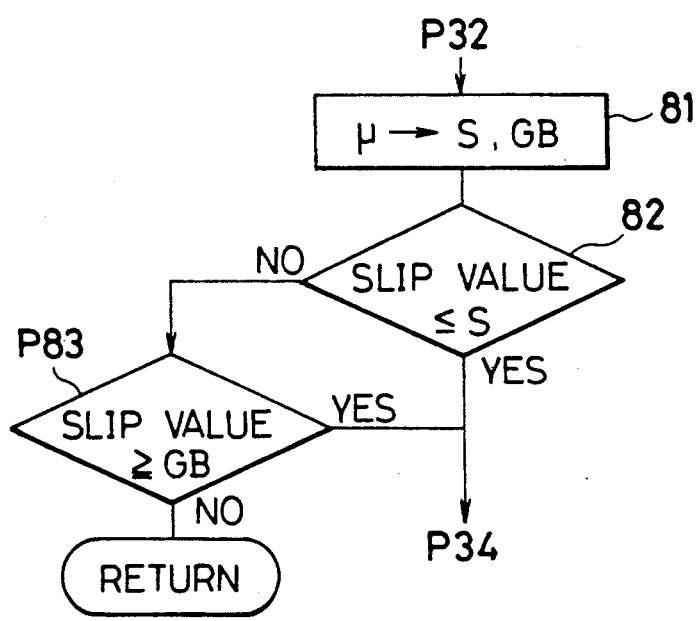

FIG. 10 shows a still further embodiment of the present invention and corresponds to steps P32 and P33 in FIG. 7 or to steps P52 and P53 in FIG. 8. The remainder is the same as in FIG. 7 and in FIG. 8.

At step P81 in FIG. 10, the reference slip value S and the reference magnitude of deceleration GB are determined in accordance with the road surface friction coefficient $\mu$ as threshold values for the start of the ABS control. The reference slip value and the reference magnitude of deceleration are set in substantially the same manner as in the previous embodiments.

Then, at step P82, it is decided to determine if the actual slip value of the wheel is equal to or smaller than the reference slip value S. When it is decided at step P82 that the actual slip value is larger than the reference slip value S, on the one hand, a further decision is made at step P83 to determine if the actual magnitude of deceleration of the wheel is larger than the reference magnitude of deceleration GB. When the decision at step P83 gives the negative result, then the program flow is returned as it is and no ABS control is started.

When it is decided at step P82 that the actual slip value of the wheel is equal to or smaller than the reference slip value S or when it is decided at step P83 that the actual magnitude of deceleration is larger than the reference magnitude of deceleration, on the other hand, the processing is implemented in the same manner as at steps P34 et seq in FIG. 7 or at steps P54 et seq in FIG. 8.

It is to be understood that the present invention is not construed as being restricted to those described hereinabove, which are described merely for illustrative purposed, and as encompassing all changes, variations, and modifications within the spirit and scope of the present invention.

What is claimed is:

1. An anti-skid brake system for an automotive vehicle capable of starting the control of braking force for preventing the wheel from being locked when a predetermined condition for starting the control thereof is met, comprising:

vehicle speed detecting means for detecting a vehicle speed;

wheel speed detecting means for detecting a speed of rotation of the wheel;

difference determining means for determining a difference between the vehicle speed detected by the vehicle speed detecting means and the wheel speed detected by the wheel speed detecting means; and inhibition means for inhibiting the start of the control of the braking force when the difference is smaller than a predetermined value.

2. An anti-skid brake system as claimed in claim 1, further comprising:

cornering detecting means for detecting cornering of the automotive vehicle; and inhibition releasing means for releasing inhibition of the start of the control of the braking force by the inhibition means when the cornering of the automotive vehicle is detected by the cornering detecting means.

3. An anti-skid brake system as claimed in claim 1, further comprising:

road surface friction coefficient $\mu$ detecting means for detecting a road surface friction coefficient $\mu$; and inhibition releasing means for releasing inhibition of the start of the control of the braking force by the inhibition means when the road surface friction coefficient $\mu$ detected by the road surface friction coefficient $\mu$ detecting means is high.

4. An anti-skid brake system as claimed in claim 1, wherein the predetermined condition is set as the moment when a magnitude of deceleration of the wheel becomes equal to or larger than a predetermined value.

5. An anti-skid brake system as claimed in claim 1, wherein the predetermined condition is set as the moment when an actual slip value of the wheel reaches a value in a direction in which the wheel indicates a larger tendency of being locked than a predetermined reference slip value.

6. An anti-skid brake system as claimed in claim 1, wherein the predetermined condition is set as the moment when at least whichever is satisfied, when a magnitude of deceleration of the wheel becomes equal to or larger than a predetermined value or when an actual slip value of the wheel reaches a value in a direction in which the wheel indicates a larger tendency of being locked than a predetermined reference slip value.

7. An anti-skid brake system as claimed in claim 1, further comprising addition means for adding up a difference computed by the difference determining means;

wherein a sum added up by the addition means is employed as a difference to be compared with the predetermined value.

8. An anti-skid brake system as claimed in claim 7, wherein, whenever the sum obtained by the addition means is renewed, the sum renewed is compared with the predetermined value, or a decision is made to determine if the inhibition by the inhibition means is implemented.

9. An anti-skid brake system as claimed in claim 8, wherein the summation by the addition means is implemented only for a predetermined period of time.

10. An anti-skid brake system as claimed in claim 7, wherein, after the sum is obtained within the predetermined period of time by the addition means, the sum is first compared with the predetermined value, or a decision is made to determine if the inhibition by the inhibition means is implemented.

11. An anti-skid brake system as claimed in claim 8, wherein the control of the braking force is set at least to reduce the braking force, to elevate the braking force or to retain the braking force.

12. An anti-skid brake system as claimed in claim 11, wherein the control of the braking force starts with a state in which the braking force is retained.

13. An anti-skid brake system as claimed in claim 1, further comprising:

cornering detecting means for detecting cornering of the automotive vehicle;

first inhibition releasing means for releasing the inhibition of the control of the braking force by the inhibition means when the cornering of the automotive vehicle is detected by the cornering detecting means;

road surface friction coefficient $\mu$ detecting means for detecting a road surface friction coefficient $\mu$; and second inhibition releasing means for releasing the inhibition of the control of the braking force by the inhibition means when a high road surface friction coefficient $\mu$ is detected by the road surface friction coefficient $\mu$ detecting means.

* * * * *